April 24, 1962  R. E. YOUNG  3,031,660
PLAN POSITION INDICATOR WITH ELEVATION INDICATION IN COLOR
Filed Jan. 15, 1957  3 Sheets-Sheet 3

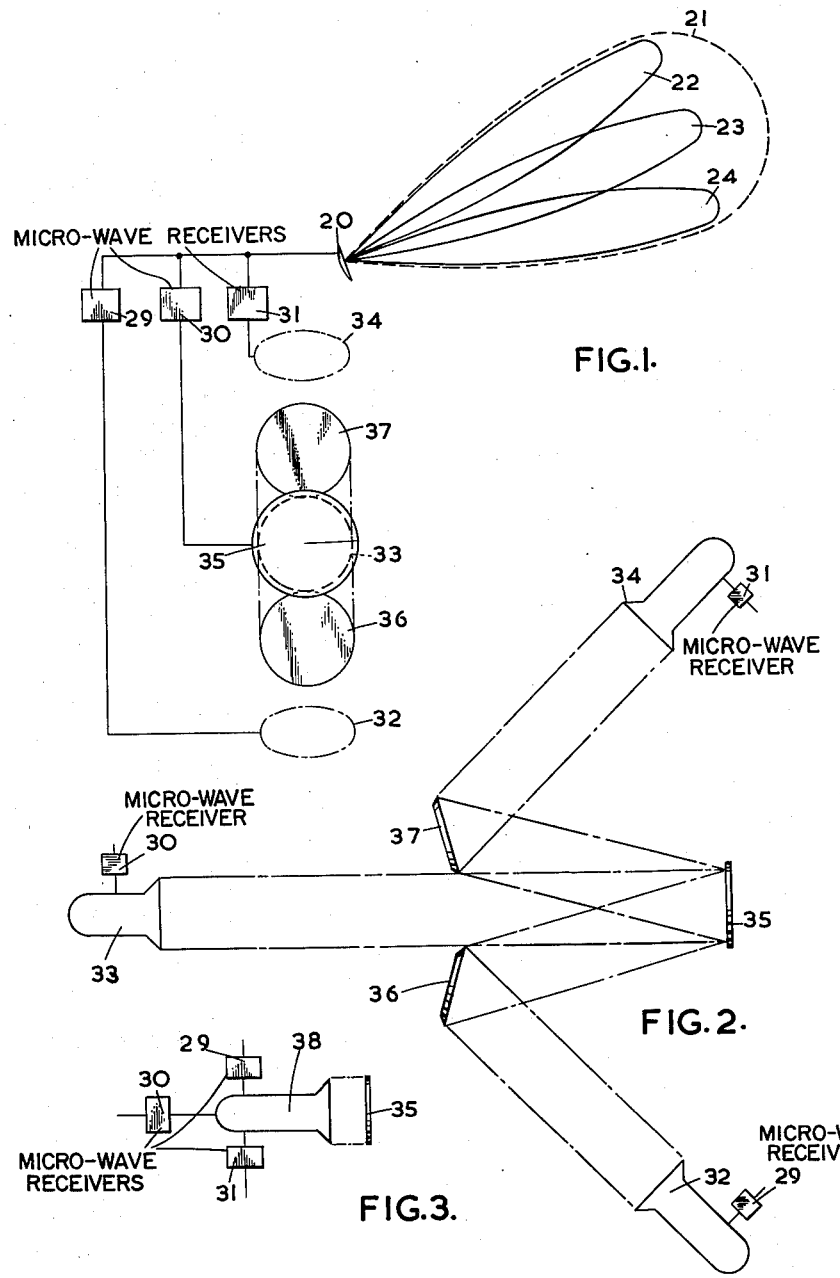

3,031,660
PLAN POSITION INDICATOR WITH ELEVATION INDICATION IN COLOR

Robert E. Young, Coventry, England (% Sir W. G. Armstrong Whitworth Aircraft Limited, Baginton, near Coventry, Warwickshire, England)
Filed Jan. 15, 1957, Ser. No. 634,299
Claims priority, application Great Britain June 22, 1956
2 Claims. (Cl. 343—11)

The invention relates to a radar system, of the kind in which a basic map-like plan position indication is arranged to coact with a radial time base of which the rotation or oscillation is synchronised with that of a beamed aerial system, and its object is to give, on the plan position indication, an indication of the altitude of a remote object (e.g., an aircraft) from which a receiving aerial of the system received a reflected signal.

According to the invention the reflected signal received by the aerial system, from a remote object which is within one of a plurality of different ranges of inclinations with a common origin at the aerial system, is fed to the plan position indication through means which cause the image of the object on the display to be given in a colour associated with the particular range of inclination in which the object lies.

The direct advantage of such a system is that plan position and vertical position are indicated on the same display. This means that time is not lost in cross reading two separate displays, which, in the case of an early warning are quite likely to be fed from two different radar sets and hence may be difficult to correlate, which in turn tends to result in error. Thus for military target detection in particular the speed of operation which is given without the possibility of error of identification is a considerable advantage.

This error is particularly dangerous in terms of giving the wrong height for an aircraft. Thus its elimination would assist greatly an air traffic controller to prevent collisions between aircraft near together in plan which have been reported incorrectly as flying at different heights. Also transfer to another radar set, as from early warning to Ground Control Approach is made much more rapid and accurate for the same reasons.

In one form of the radar system of the invention the transmitting aerial, of the aerial system, has a lobe which is broad in the vertical plane, and the receiving aerial of the said system is arranged to give a plurality of separate, narrow polar diagrams which are at different inclinations and are each associated with means for giving a display in a different colour on the plan position indication.

Thus, in one example, the receiving aerial includes separate elements for producing the separate, narrow polar diagrams, and each of these elements is connected to a receiving chain associated with an individual plan position indication cathode ray tube having a distinctive colour response, these cathode ray tubes directing their images on the basic plan position indication by optical means.

In another example the receiving aerial includes separate elements for producing the separate, narrow polar diagrams, and each of the elements is connected, through a receiving chain, to a separate section of a multi-colour response, plan position indication cathode ray tube.

The same results could also be obtained by selecting the outputs of a multi-element aerial array, with either separate or common aerial working, by means of a waveguide switch, or a coaxial line radio frequency switch, to provide angular selection in terms of colour.

According to a further feature of the invention, the transmitting and receiivng aerials have identical narrow polar diagrams and are synchronously oscillated, at high speed, over a suitable angle in the vertical direction; selector means, actuated responsively to this vertical oscillation, being provided to feed the appropriate one of a plurality of cathode ray tubes having different colour responses, or the appropriate section of a multi-colour response cathode ray tube to give an image, on the basic plan position indication, in a colour appropriate to the inclination of a remote object from which a received signal is reflected.

Instead of employing a plurality of cathode ray tubes in accordance with the last-mentioned feature, a single plan position indication cathode ray tube with a monochromatic (e.g., white) response can be used, and the cathode ray tube be arranged to produce the plan position display through a parti-coloured translucent member which is oscillated synchronously with the aerials to interpose an area, of a colour appropriate to the inclination of a remote object from which a reflected signal is received, between the cathod ray tube and the plan position display.

Preferably the three polar diagrams give three primary colour responses (i.e., blue, green and red, in descending order of inclination) respectively, and, according to yet another feature of the invention, the three polar diagrams are arranged for their adjacent side edges to overlap to a controlled extent whereby to produce secondary colour responses for the purpose of more accurately displaying the inclination of the object giving the reflected signal.

According to yet another feature of the invention means are provided for cutting off both ends of the polar diagrams of the transmitting and receiving aerials so that they only give indications between selected upper and lower limiting planes.

Various embodiments of the radar system of the invention are illustrated diagrammatically in the accompanying drawings, in which:

FIGURE 1 illustrates an embodiment in which the receiving aerial is such as to provide three narrow polar diagram lobes which are fed to respective plan position indication cathode ray tubes having different colour responses, and the cathode ray tube images are superimposed by optical means on the plan position indication;

FIGURE 2 illustrates an arrangement of the cathode ray tubes and optical means of the FIGURE 1;

FIGURE 3 illustrates a modification of the system of FIGURE 1 according to which the three polar diagram lobes feed respective sections of a three-colour response plan position indication cathode ray tube;

Figure 4:
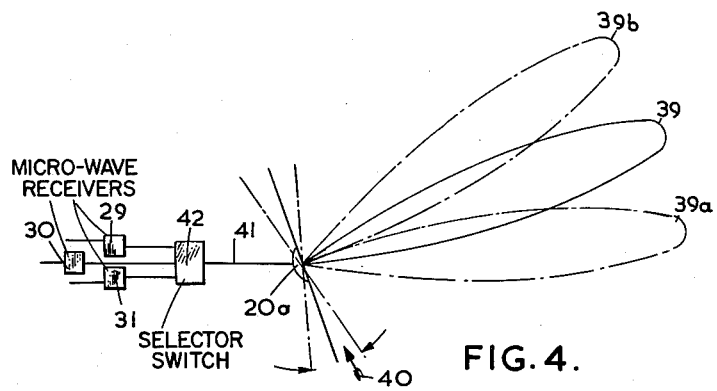
Figure 5:
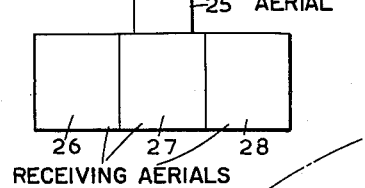
Figure 6:
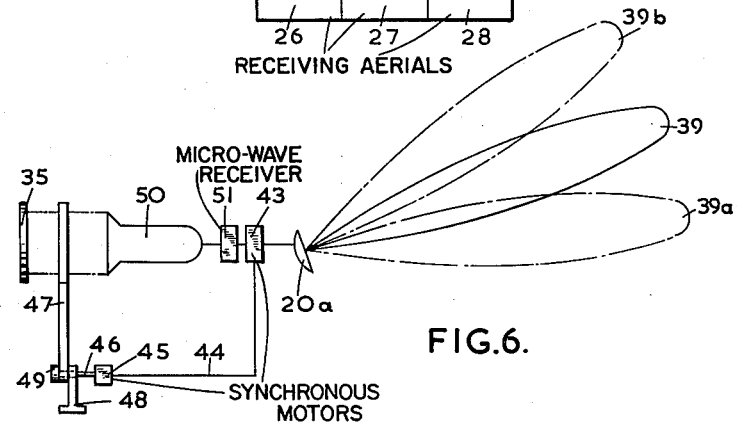
Figure 7:
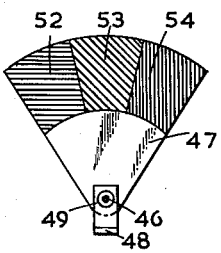
Figure 8:
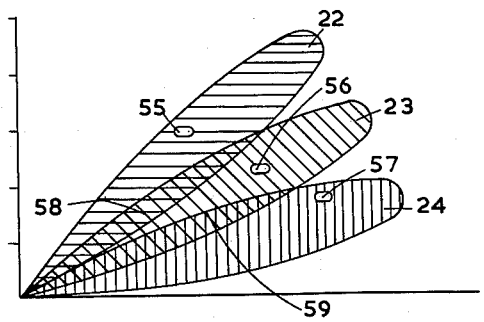
Figure 10:
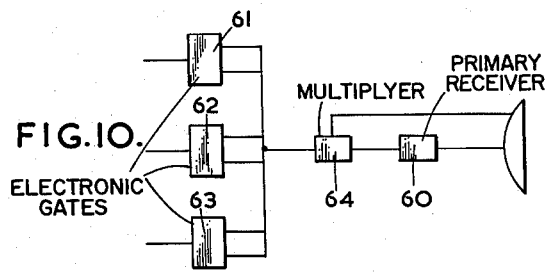
Figure 9:
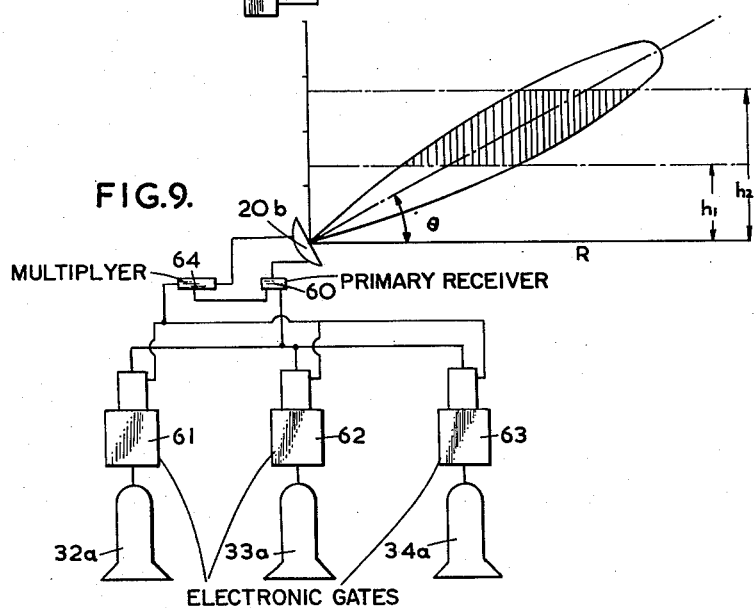

FIGURE 4 illustrates an embodiment in which the transmitting and receiving aerials have identical narrow polar diagram lobes and are synchronously oscillated, at high speed, over a suitable angle in the vertical direction, the receiving aerial coacting with a selector means for feeding either separate cathode ray tubes as in FIGURES 1 and 2, or separate sections of a multi-colour response cathode ray tube as in FIGURE 3, for giving a plan position indication in a colour appropriate to the inclination of the object from which the reflected signal is derived;

FIGURE 5 is a diagrammatic front view of an aerial of a suitable kind for use in the embodiments of FIGURE 1;

FIGURE 6 is a modification of the embodiment of FIGURE 4 according to which a monochromatic plan position indication cathode ray tube is used in conjunction with a parti-coloured translucent member which is oscillated synchronously with the aerials;

FIGURE 7 is a diagrammatic front view of the translucent member of FIGURE 6;

FIGURE 8 illustrates how the polar diagram lobes of FIGURE 1 can be made to overlap for giving intermediate indications of the inclination of an object from which a reflected signal is derived;

FIGURE 9 illustrates a modification in which both ends of the polar diagram lobes of the transmitting and receiving aerials are cut off so that they only give indications between selected upper and lower limiting planes, and FIGURE 10 is a diagram of the major components of the system of FIGURE 9.

Referring to FIGURES 1 and 2, the transmitting and receiving aerial assembly is indicated at 20, the polar diagram lobe of the transmitting aerial at 21, and the three polar diagram lobes of the receiving aerial at 22, 23 and 24. The aerial assembly is shown in FIGURE 5 where 25 indicates the transmitting aerial and 26, 27 and 28 the three components of the receiving aerial.

The receiving aerial components 26, 27 and 28 are respectively connected to micro-wave receivers, with video outputs, indicated at 29, 30 and 31 in FIGURE 1, and these receivers are respectively connected to feed plan position indication cathode ray tubes 32, 33 and 34. The tube 33 is arranged to illuminate a plan position indication screen 35 directly, and the tubes 32 and 34 are arranged to illuminate the said screen by reflection from mirrors 36 and 37 which are laterally spaced from the beam of tube 33. The light paths from each of the tubes to the screen should be identical in length and, of course, the three images on the screen are accurately superimposed.

The tubes 32, 33 and 34 have different colour responses (say, blue, green and red, respectively), and the associated lobes 22, 23 and 24 are at different inclinations. It follows, therefore, that if the transmitted signal is reflected from, say an aeroplane situated in the zone of lobe 22, tube 32 will be energised to give a blue image on the screen 35. This image will, apart from its colour, be the normal one on the screen giving the range of the aeroplane, so that the colour of the image will give an additional indication of altitude within the limits of the vertical dimension of the active receiving lobe.

Instead of using the separate plan position indication cathode ray tubes 32, 33 and 34, the receivers 29, 30 and 31 can be connected to energise the separate colour sections of a single multi-colour response plan position indication cathode ray tube 38 as indicated in FIGURE 3. This arrangement avoids the need for the mirrors 36 and 37, but it gives the same result.

Referring now to FIGURE 4, the transmitting and receiving aerials, of which the assembly is indicated at 20a, have identical, narrow, coincident, polar diagrams 39, and the aerial assembly is oscillated at high speed over an angle 40 in the vertical direction. The said assembly is mechanically connected by linkage 41 to operate, say, a selector switch 42 for selecting one of the receivers 29, 30 and 31 dependently on the instantaneous inclination of the said diagram. Thus, when the latter is in the full-line position 39 the receiver 30 will be selected, while when it is in either of the extreme positions 39a and 39b the receivers 29 or 31 will be selected respectively. These receivers are connected in the manner of FIGURE 1 or FIGURE 3 to cause an image to appear on the screen in a colour appropriate to the inclination of the lobe 39 when the reflected signal was received.

In FIGURE 6, the vertical oscillation of the aerial assembly is by a synchronous motor 43 which, through a connection indicated at 44, drives a second synchronous motor 45 on the shaft 46 of which is mounted a particoloured translucent member 47. The shaft is shown supported in a bracket 48, and the member 47 held thereon by a nut 49. A single, monochromatic plan position indication cathode ray tube 50 is fed from a micro-wave receiver, with video output, indicated at 51, and the tube illuminates the plan position indication screen 35 through one of the coloured zones of the member 47 in dependence on the inclination of the lobe 39. The member 47 (see FIGURE 7) is shown provided with translucent zones 52, 53 and 54 of different colours (e.g., blue, green and red, as before) so that the reflected signal will be shown in a colour associated with the inclination of the lobe.

The effect of the three receiving lobes of FIGURE 1 being made to overlap laterally is now explained further with reference to the graphical representation of FIGURE 8, in which the abscissae indicate horizontal range and the ordinates altitude. The lobe 22 is associated, as hereinbefore stated, with a blue image on the plan position indication display screen, the lobe 23 with a green one, and the lobe 24 with a red one, so that if an aircraft should be in any of the positions indicated at 55, 56 or 57 its image will appear in the colour appropriate to the lobe. The overlapped area 58 of the lobes 22 and 23 will cause both colour displays to be given simultaneously on the screen 35 (i.e., a turquoise image), while the overlapped area 59 of the lobes 23 and 24 will produce a yellow image.

By observing the colour of the signal received on the plan position indication, the observer is simultaneously informed as to the distance of a remote object and as to a range of altitudes within which it lies, and this enables the observer to determine, in the case of an aircraft, whether it is too high or too low for effecting a safe landing on an aerodrome equipped with the radar system of the invention, or whether it is at a safe height for landing, in which latter event the pilot can be guided to maintain the appropriate colour response with the system operating as a Ground Control Approach one. Assuming that the central, green lobe 23 in the example given above is the one to be used for Ground Control Approach, should the approaching aircraft descend at too shallow an angle it will enter the area 58 and the response colour will be turquoise, while if it descends too steeply the resultant response is yellow. Hence a colour indication is given of any relatively small departure from the centre of the green lobe, i.e. before it has passed completely into the blue or red lobes.

A variant of the basic system is shown in FIGURES 9 and 10 where colour is associated with a height layer. Thus for a layer established between heights $h_1$ and $h_2$ (e.g., between 10,000 and 20,000 feet) for a three tube display, one tube is fed when the aircraft is flying at any height $h$ between $h_1$ and $h_2$ and the other two tubes when the aircraft is lower than $h_1$ or higher than $h_2$ respectively. If the aircraft is at a range of R from the radar station and at angle of elevation $\theta$ with respect to it, $h = R \sin \theta$.

The aerial 20b of FIGURE 9 is vertically oscillated as in the case of FIGURE 4 and feeds a primary receiver 60. The output from the latter is fed to three electronic gates 61, 62, 63 in parallel and these are for respectively feeding the plan position indication cathode ray tubes 32a, 33a and 34a. The voltage controlling the gates varies in accordance with $R \sin \theta$, where R is the range strobe voltage, and the controlling voltage is fed to the gates from an electronic multiplyer 64 which gives the product of R and $\sin \theta$.

The three tubes give different colour responses, as before, and it is arranged, for example, for tube 61 to be operated when the aerial is at such an angle $\theta$ and range R that it receives a reflected signal from an aircraft above height $h_2$, for tube 62 to function when $\theta$ and R are within a range corresponding to the aircraft being between heights $h_1$ and $h_2$, and for tube 63 to become illuminated when $\theta$ and R are of values corresponding to the aircraft being lower than $h_1$.

What I claim as my invention and desire to secure by Letters Patent of the United States is:

1. A radar system comprising a beamed aerial system having separate transmitting and receiving aerials and means for displaying a basic map-like plan position indication and having a radial time base of which the movement is synchronised with that of the said beamed aerial system, said aerial system including a transmitting aerial having a lobe which is narrow in a vertical plane, and said aerial system including a receiving aerial having a polar diagram identical with said lobe, means connected to oscillate said transmitting and receiving aerials synchronously at high speed over an angle in the vertical direction, said means for displaying being a plurality of cathode ray tubes having different colour responses to give images on the plan position indication, and selector means actuated responsively to the oscillation of said aerials for selecting feed lines to said cathode ray tubes in dependence on sectors of inclinations through which said aerials pass during their said vertical oscillation, whereby a received signal reflected from a remote object which is within one of the said sectors of inclinations is fed to the cathode ray tube selected by said selector means to cause an image of the object on the display to be given in the colour of the response of the said selected cathode ray tube.

2. A radar system comprising a beamed aerial system having separate transmitting and receiving aerials and means for displaying a basic map-like plan position indication and having a radial time base of which the movement is synchronised with that of the said beamed aerial system, said aerial system including a transmitting aerial having a lobe which is narrow in a vertical plane, and said aerial system including a receiving aerial having a polar diagram identical with said lobe, means connected to oscillate said transmitting and receiving aerials synchronously at high speed over an angle in the vertical direction, said means for displaying being a multi-colour response plane position indication cathode ray tube of which the individual colour-response sections give images on the plan position indication, and selector means actuated responsively to the oscillation of said aerials for selecting feed lines to said individual colour-response sections in dependence on sectors of inclinations through which said aerials pass during their said vertical oscillation, whereby a received signal reflected from a remote object which is within one of the said sectors of inclinations is fed to the individual colour-response section selected by said selector means to cause an image of the object on the display to be given in the colour of the response of the selected individual colour-response section.

References Cited in the file of this patent

UNITED STATES PATENTS

| | | |
|---|---|---|
| 2,399,671 | Gage | May 7, 1946 |
| 2,403,728 | Loughren | July 9, 1946 |
| 2,407,169 | Loughren | Sept. 3, 1946 |
| 2,508,358 | Ayres | May 23, 1950 |
| 2,784,400 | Ehrenfried | Mar. 5, 1957 |

FOREIGN PATENTS

| | | |
|---|---|---|
| 745,571 | Great Britain | Feb. 29, 1956 |